United States Patent
Hoff et al.

(10) Patent No.: US 9,471,902 B2
(45) Date of Patent: Oct. 18, 2016

(54) PROXY FOR ASYNCHRONOUS MEETING PARTICIPATION

(75) Inventors: Aaron Hoff, Kirkland, WA (US); Kori Inkpen Quinn, Redmond, WA (US); Paul Johns, Tacoma, WA (US); Asta Roseway, Bellevue, WA (US); Chen Zhao, Beijing (CN); Xiang Cao, Beijing (CN); Jennifer Marlow, Pittsburgh, PA (US); John C. Tang, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1206 days.

(21) Appl. No.: 13/304,371

(22) Filed: Nov. 24, 2011

(65) Prior Publication Data
US 2013/0139071 A1    May 30, 2013

(51) Int. Cl.
G06F 3/048    (2013.01)
G06Q 10/10    (2012.01)
G06F 17/30    (2006.01)

(52) U.S. Cl.
CPC ..... *G06Q 10/1095* (2013.01); *G06F 17/30056* (2013.01); *G06F 17/30* (2013.01)

(58) Field of Classification Search
CPC .............. G06Q 10/1095; G06Q 10/10; G06F 17/30056; G06F 17/30
See application file for complete search history.

(56) References Cited

U.S. PATENT DOCUMENTS

| | | |
|---|---|---|
| 2005/0210393 A1 | 9/2005 | Maeng |
| 2007/0005812 A1 | 1/2007 | Moore |
| 2008/0184122 A1 | 7/2008 | Grant et al. |
| 2009/0307189 A1 | 12/2009 | Bobbitt et al. |
| 2009/0327425 A1* | 12/2009 | Gudipaty ............ H04L 65/1093 709/205 |
| 2010/0037151 A1* | 2/2010 | Ackerman ............. G06Q 10/10 715/753 |
| 2010/0100594 A1 | 4/2010 | Frees et al. |
| 2010/0138756 A1* | 6/2010 | Saund et al. .................. 715/758 |
| 2011/0122220 A1* | 5/2011 | Roberts .................. G06Q 10/10 348/14.04 |
| 2011/0134204 A1* | 6/2011 | Rodriguez ............. G06Q 10/10 715/757 |
| 2012/0260195 A1* | 10/2012 | Hon et al. ...................... 715/753 |
| 2012/0317210 A1* | 12/2012 | Fisher .................. G06Q 10/107 709/206 |
| 2015/0081629 A1* | 3/2015 | Newman ........... G06F 17/30578 707/613 |

OTHER PUBLICATIONS

Adams, et al., "Distributed Research Teams: Meeting Asynchronously in Virtual Space", Retrieved at <<http://ieeexplore.ieee.org/stamp/stamp.jsp?tp=&arnumber=772676>>, Proceedings of the 32nd Hawaii International Conference on System Sciences, Jan. 5-8, 1999, pp. 1-10.

(Continued)

*Primary Examiner* — Manglesh M Patel
*Assistant Examiner* — Nicholas Hasty
(74) *Attorney, Agent, or Firm* — Florin C. Corie; Sandy Swain; Micky Minhas

(57) ABSTRACT

Embodiments described herein relate to enabling a lightweight way of recording and sharing video messages intended to provide input to a future meeting that cannot be personally attended. A person who cannot attend the meeting pre-records their thoughts and remarks for the meeting as video clips for presentation at the meeting. A physical device with at least a display is presented at the meeting. The physically present participants can play the pre-recorded clips on the device. Video of participants' responses to the clips is recorded and made available so that the represented attendee can view the participants' responses.

20 Claims, 8 Drawing Sheets

(56) References Cited

OTHER PUBLICATIONS

Watt, et al., "Asynchronous Videoconferencing: A Hybrid Communication Prototype", Retrieved at <<http://coms.uconn.edu/directory/faculty/HCILab/publications/Watt.Walther.Nowak-2002-HICSS.pdf>>, Proceedings of the 35th Hawaii International Conference on System Sciences, Jan. 7-10, 2002, pp. 1-9.

Lachut, Scott, "The Next Step in Social Media: Asynchronous Video Conversations", Retrieved at <<http://www.psfk.com/2011/01/the-next-step-in-social-media-asynchronous-video-conversations.html>>, Jan. 11, 2011, pp. 9.

"Asynchronous Video Threads", U.S. Appl. No. 13/159,201, filed Jun. 13, 2001, pp. 28.

* cited by examiner

US 9,471,902 B2

PROXY FOR ASYNCHRONOUS MEETING PARTICIPATION

BACKGROUND

Due to busy schedules and time zone differences, it can be difficult for a person to attend a meeting. Participants with large time zone differences may be limited to attending at inconvenient times of day. Some participants may not be able to attend. Although a meeting may be video recorded to allow participants unable to attend to catch up on the discussion at the meeting, reviewing recorded meetings can be tedious and time-consuming and offers no opportunity to interact during the meeting. Generally it is difficult for someone to obtain the benefits of a meeting without actually attending the meeting in real time.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments described herein relate to enabling a lightweight way of recording and sharing video messages intended to provide input to a future meeting that cannot be personally attended. A person who cannot attend the meeting pre-records their thoughts and remarks for the meeting as video clips for presentation at the meeting. A physical device with at least a display is presented at the meeting. The physically present participants can play the pre-recorded clips on the device. Video of participants' responses to the clips is recorded and made available so that the represented attendee (not physically present at meeting) can view the participants' responses.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to allowing a person who cannot attend a meeting to create a proxy representative that represents the person at the meeting. The proxy representative allows the represented attendee to asynchronously interact with the meeting without attending in person. The proxy representative may function as a simulation of the represented attendee, for example by providing pre-recorded video messages of the represented attendee that can be triggered by participants at the meeting. Moreover, the proxy representative may capture reactions of participants to the pre-recorded video messages, which the represented attendee can later review.

Discussion of embodiments will proceed with an overview of the general approach of authoring a proxy representative, using the proxy representative at a meeting, and after the meeting the viewing information captured by the proxy representative during the meeting. Following the general overview, each of these three stages will be described in detail.

Figure 1:
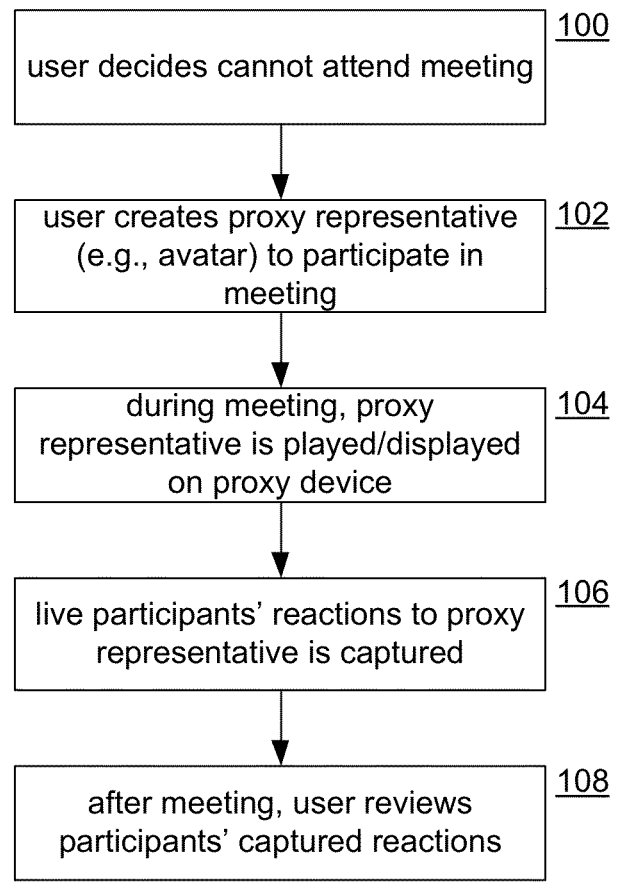
FIG. 1 shows a general process for using a proxy device.

FIG. 1 shows a general process for using a proxy device. At step 100, a user decides that he or she cannot attend a scheduled meeting, for example, due to a schedule conflict or a large time zone difference. At step 102, the user creates a proxy representative to participate in the meeting in place of the user. This may involve the user creating content or media to be conveyed to participants of the meeting, for example in the form of notes or pre-recorded video clips of the user addressing the meeting. At step 104, during the meeting the proxy representative, embodied on a proxy device such as a display, tablet, terminal, etc., is played or displayed. The proxy representative may have a default video loop of the represented attendee that plays on the device until a participant interacts with the proxy representative to cause the proxy representative to display or play some of the pre-recorded video or content. At step 106, reactions of the live participants to playing of the pre-recorded video clips or other content are captured and correlated with the displayed output or content (topics) of the proxy representative. At step 108, after the meeting is over, the represented attendee reviews the captured portions of the meeting, for example portions that follow the playing of a pre-recorded video clip and presumably containing reactions of attendees to the pre-recorded video clip.

In effect, the proxy representative enables a lightweight way to record and share video messages intended to serve as input to a pending meeting that cannot be personally attended. The represented attendee pre-records their thoughts in a series of video messages for presentation at the meeting and their absence. Reactions and responses to those thoughts are recorded in the meeting for the represented attendee to review later. This form of asynchronous video messaging may encourage interaction among team members without all members having to meet synchronously.

Figure 2:
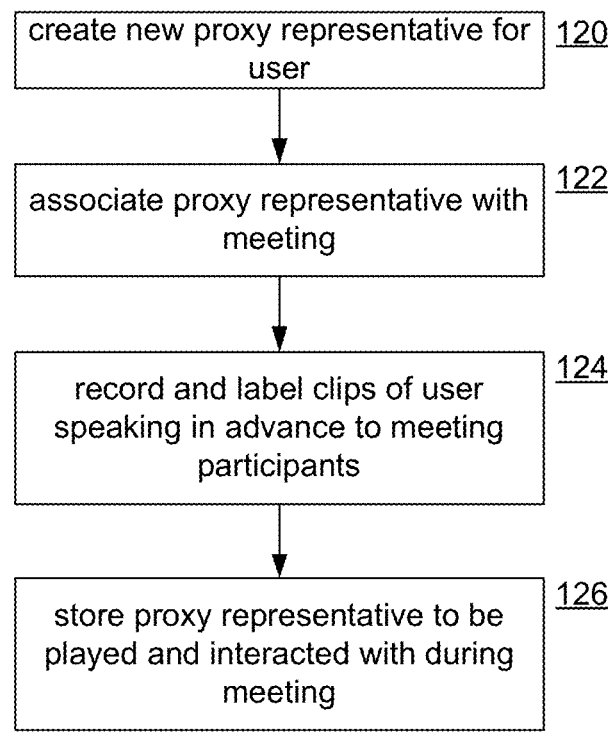
FIG. 2 shows a process for creating a proxy representative.

FIG. 2 shows a process for creating a proxy representative. At step 120, the represented attendee (user) begins to create a new proxy representative. At step 122, the user may select or indicate a particular meeting that the user will attend by proxy. At step 124, a user interface is displayed to allow a lightweight way for the user to record video clips or messages, label or title messages, create annotations, link to documents, etc. At step 126, the proxy representative of the user is stored and is ready to be played and interacted with during the upcoming meeting.

To elaborate, a lightweight mechanism is provided to allow the represented attendee to pre-record video messages. This allows the user to create short clips that capture thoughts to be contributed to the meeting. In one embodiment the recording mechanism is integrated with meeting scheduling software, allowing the pre-recorded messages to be distributed to the participants in advance and making them available during the meeting. In one embodiment, a video recording program associates a subject heading or title with each of the pre-recorded video messages (similar to video mail). The recording program may also record a video loop avatar, which serves as a default representation of the represented attendee that will play continually during the meeting to remind physically present participants of the participation of the represented attendee. In one variation, the avatar need not be only visual; the avatar may comprise subtle sounds or any media that indicates the presence of a person. That is, a proxy representative may have media such as video, captured images, audio, etc. This avatar can be expressly recorded or it can be extracted from the topical pre-recorded video messages. In practice, video messages may be pre-recorded at a user's workstation or other terminal and stored in the data layer of an n-tier application for later access by a proxy device or equivalent during the meeting. In another embodiment, a proxy device such as a tablet or laptop may record and store the pre-recorded video clips locally. In either case, the proxy device may be present at the meeting and may continually display the default avatar clip (or other media) and play message clips as needed.

Regarding the recording program, a number of enhancements may be implemented to improve the exchange of information between the represented attendee and the other attendees. Subtle improvements in the quality of the content of pre-recorded messages may be obtained by displaying clips or images of attendees while the represented participant is recording messages. In an integrated messaging system, the system might retrieve and display avatar clips or images previously generated by the other attendees. Seeing the attendees while recording may cause the messages to be more direct and personable and may help avoid the impersonal qualities similar to telephone answering machine messages. In other words, techniques may be used to help evoke conversational qualities in the recorded messages. While messages are recorded, to avoid overly long messages, some visual feedback may be provided to let the user know when a message may be running long. For example, a ticking clock, a progress bar, or other graphic or animation may be displayed.

Regarding the automatic avatar generation mentioned above, a set of one or more default loops can be automatically generated by analyzing the represented attendee's pre-recorded video messages. The analysis may involve identifying sequences with criteria such as: the represented attendee is not talking, has minimal movement, is facing the camera, etc. In some cases an overly realistic avatar loop might be initially perceived by physically present attendees as a live teleconference feed. Such attendees may have an embarrassed or negative reaction when they discover that the avatar is not the live actual person. Therefore, it may be helpful for the avatar to have properties that indicate that it is not a live person. In the case of video clips, the clips might be intentionally modified (e.g., speed, appearance, etc.) to reduce their realism. In one embodiment, the avatar may be only a series of cyclically displayed still images of the represented attendee, perhaps with transition effects.

In one embodiment, the avatar might be a single image, a rendering of a computer-generated model, etc. Generally, an avatar can take a variety of visual forms. In terms of behavior, the avatar may be either a static visual that provides a default representation of the represented attendee when the proxy representative is idle, or a dynamic visual that changes in response to input and conditions such as whether or who is currently talking, how long a person is talking, action the proxy attendant might be taking (e.g., recording feedback), etc. Note that these techniques for providing visual information to the represented participant can also be used when capturing feedback to a message during the meeting. For example, a visual indicating the passage of time while recording a reaction or a reply may be displayed. In another embodiment, the avatar might change appearance when feedback is being recorded. For example, where a slideshow or animation might be the default avatar, when the proxy device is recording an attendee speaking, the avatar might change to a realistic clip, e.g., a high quality clip of the represented participant appearing attentive and with minimal signs of having been pre-recorded. This may enhance the sense of conversation (albeit delayed) between the attendees and the represented attendee.

Figure 3:
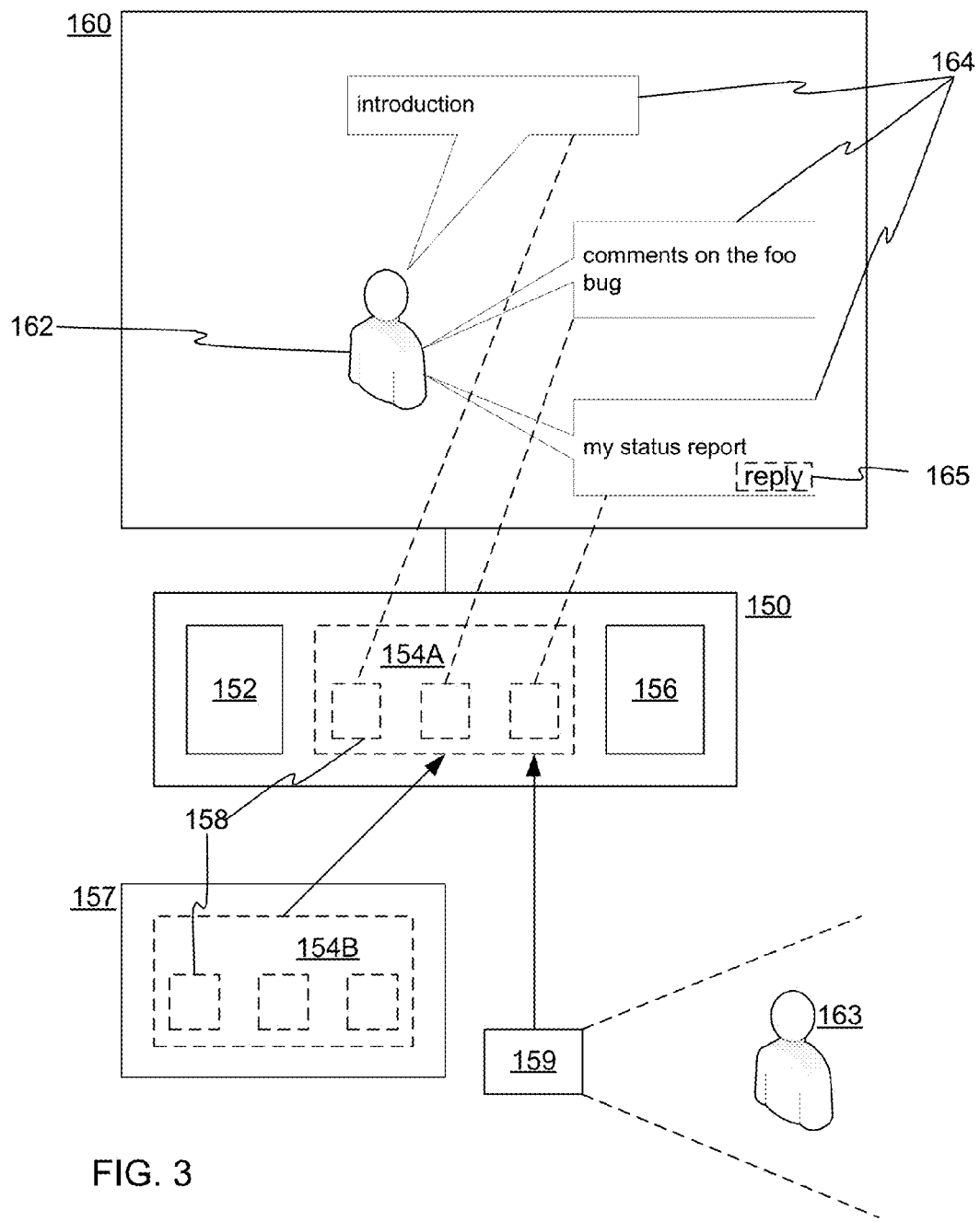
FIG. 3 shows an example of a proxy device that physically represents a person at a meeting.

FIG. 3 shows an example of a proxy device 150 that physically represents a person at a meeting. During the meeting the proxy device 150 presents the proxy representative, which can be interacted with by the meeting participants. The proxy device 150 may have a processor 152, volatile and/or nonvolatile storage 154A (e.g., memory, storage media, etc.), and input/output components 156 such as a touch screen, microphone, speakers, video camera, etc., as well as network facilities to communicate with a server 157 having storage 154B. The proxy device 150 may either stream or cache the pre-recorded video clips 158 to local storage 154A from server 157 (for rendering), or may store the clips locally without accessing the clips from storage 154B. The storage 154A/154B may also store titles, metadata, or other information related to the proxy representative, such as an identifier of the associated meeting. The pre-recorded video clips 158 of the represented participant 163 may have been captured with a camera 159. In one embodiment the proxy device 150 is a remote system or server, and another device acts as a terminal and communicates with the remote system or server. In either case, a display 160 displays the proxy representative 162 and possibly user interface elements 164.

In the example of FIG. 3, the user interface elements 164 indicate topics of the pre-recorded video clips 158 that are available to be played. For example, one element identifies an introduction clip, another element identifies a clip or message about a software bug, and another element identifies a clip about a status report. It will be appreciated that the user interface can vary in appearance and functionality; any approach can be used that allows a user to interact with the proxy device/representative to invoke particular pre-recorded messages, to direct feedback to the represented attendee, etc. In one embodiment a touch sensitive screen is used, and a pre-recorded message is played by a meeting participant by touching a corresponding bubble or user interface element 164. As discussed in detail below, the user interface of the proxy representative may also have a mechanism to allow users to submit impromptu messages to the proxy device/representative or to record feedback to a particular topic. For example, a user interface feedback button may be activated, causing the proxy device to capture video and store the video of the impromptu feedback for later viewing by the represented attendee.

In one embodiment, one or more of the user interface elements 164 may have a reply button 165 or other means for indicating to the proxy device that a message is to be recorded in association with the corresponding topic. In the example of FIG. 3, if a participant activates reply button 165, recording begins and the recorded clip is associated with the corresponding topic.

Figure 4:
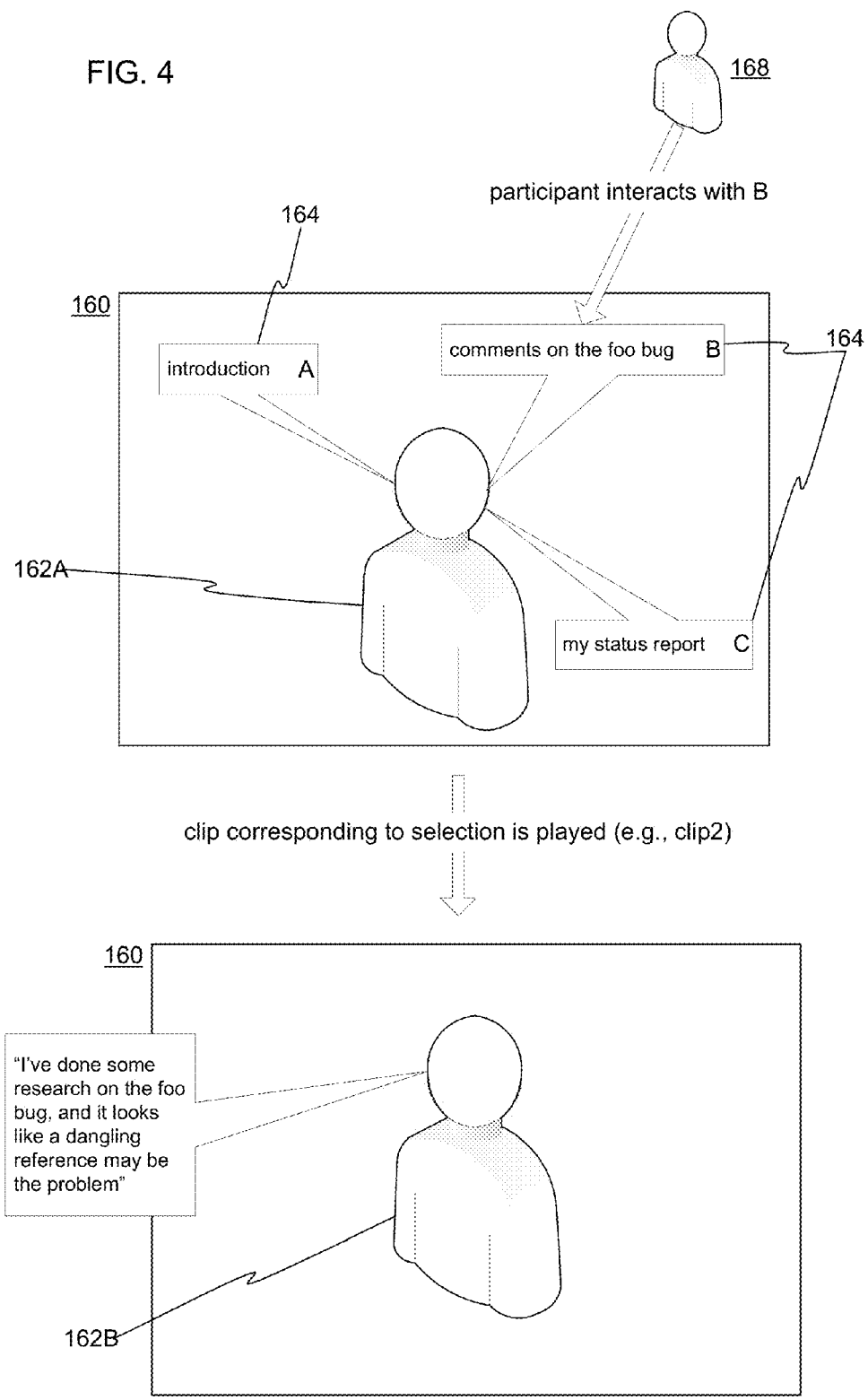
FIG. 4 shows an example interaction with a proxy representative.

FIG. 4 shows an example interaction with a proxy representative. Proxy representative 162A is shown in a default loop state; a default avatar loop is playing, for example, showing the represented attendee glimpsing around, blinking, and appearing attentive. During the meeting, a participant 168 interacts with the proxy representative/device, for example activating a user interface element 164, speaking a voice command, etc. In response to the input, a clip or pre-recorded video that corresponds to the selection is then played. On the display 160 the participant 168 sees the selected pre-recorded video clip being played, with a corresponding representation (graphic, video, image(s), etc.) of proxy representative 162B.

Figure 5:
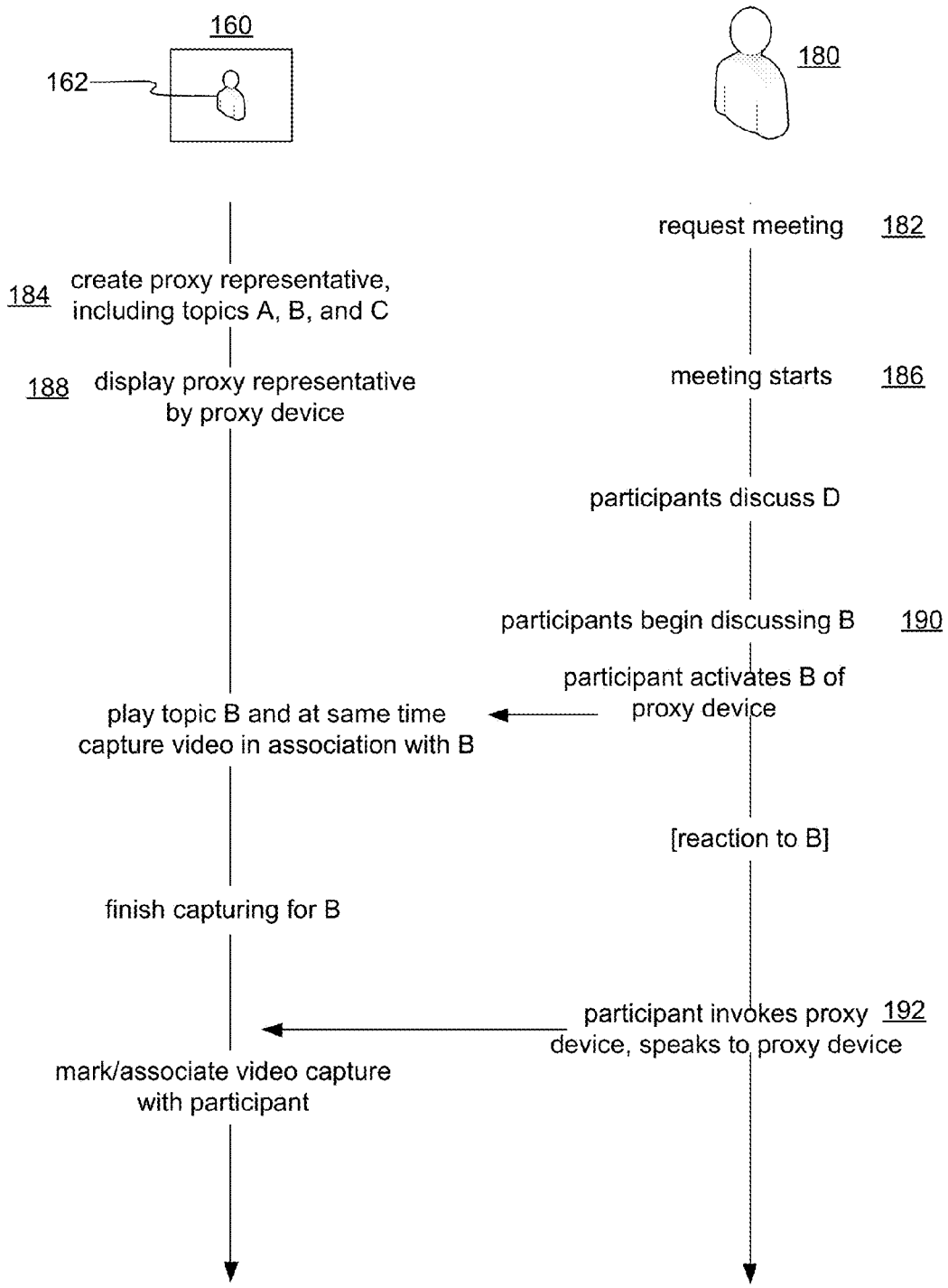
FIG. 5 shows a sequence of the proxy device at a meeting with at least one participant.

FIG. 5 shows a sequence of the proxy representative 162 at a meeting with at least one participant 180. Initially, at time 182 a meeting is requested. A person unable to attend, at time 184, creates a proxy representative as discussed above, pre-recording video clips of topics A, B, and C. At time 186 the meeting begins, and around the same time—at time 188—the proxy representative is activated and displayed on display 160 at the meeting. Note that the proxy device 150 need not be the device that was used to pre-record the vide messages 158. Note also that the two columns in FIG. 5 represent actions of the proxy device 150 and the meeting attendees, respectively.

During the meeting the participants may discuss various topics while the default avatar loop of the proxy representative 162 is playing. At time 190, when the physically present participants begin discussing topic B, participant 180 activates pre-recorded clip B of the proxy representative, causing the corresponding one of the pre-recorded video clips 158 to be played on the display 160. To allow the represented participant to later view reactions to the video clip, the proxy device 150 causes video of the meeting to be captured (or marked or associated) with reference to topic B. In other words, a select portion of the meeting, which is in close temporal proximity to activation of the clip, is automatically captured or indexed. Depending on implementation, the start and end time of the select portion can vary. For example, the start time might be some fixed time prior to playing of the clip (for example one minute), or the time when the clip began to play, or the time when the clip finished playing. The end time might be a fixed duration (for example five minutes), or a dynamic duration (for example, at a time when a lull is automatically detected), or when there is a new interaction with the proxy representative 162 (for example a new clip is played), etc.

Note that the captured or indexed portion of the meeting should include reaction of participants to the clip that was played. Note that during times when the proxy representative is inert (neither playing nor capturing video), the default avatar clip may be played. Furthermore, a special avatar clip may be played while the proxy device is capturing participant feedback. For example, a loop of the represented participant appearing attentive or listening carefully may be played. Feedback capture can be initiated as part of the message playback process, as discussed above, or feedback can be explicitly triggered. For example, after playing a pre-recorded message clip, the proxy representative/device may display a "reply" button to allow a participant to start recording feedback that will be associated with the pre-recorded message clip.

In one embodiment, the proxy device is configured to allow participants to direct impromptu feedback to the participant represented by the proxy. For example, referring to FIG. 5, at time 192, participant 180 interacts with the proxy device 150 to indicate that a comment is forthcoming, perhaps by using a voice command or feedback button on the display 160. In response the proxy device 150 captures or indexes video of participant 180 speaking to the device hosting the proxy representative.

In another embodiment, the proxy representative may include a user interface element that allows a participant to direct a feedback comment to a particular topic displayed by the proxy device. In other words, rather than automatically capturing feedback after playing a prerecorded video clip, it is also possible for a participant to interact with the proxy representative by selecting a particular topic, and the proxy device captures video of the participant and associates the video with the selected topic.

Figure 6:
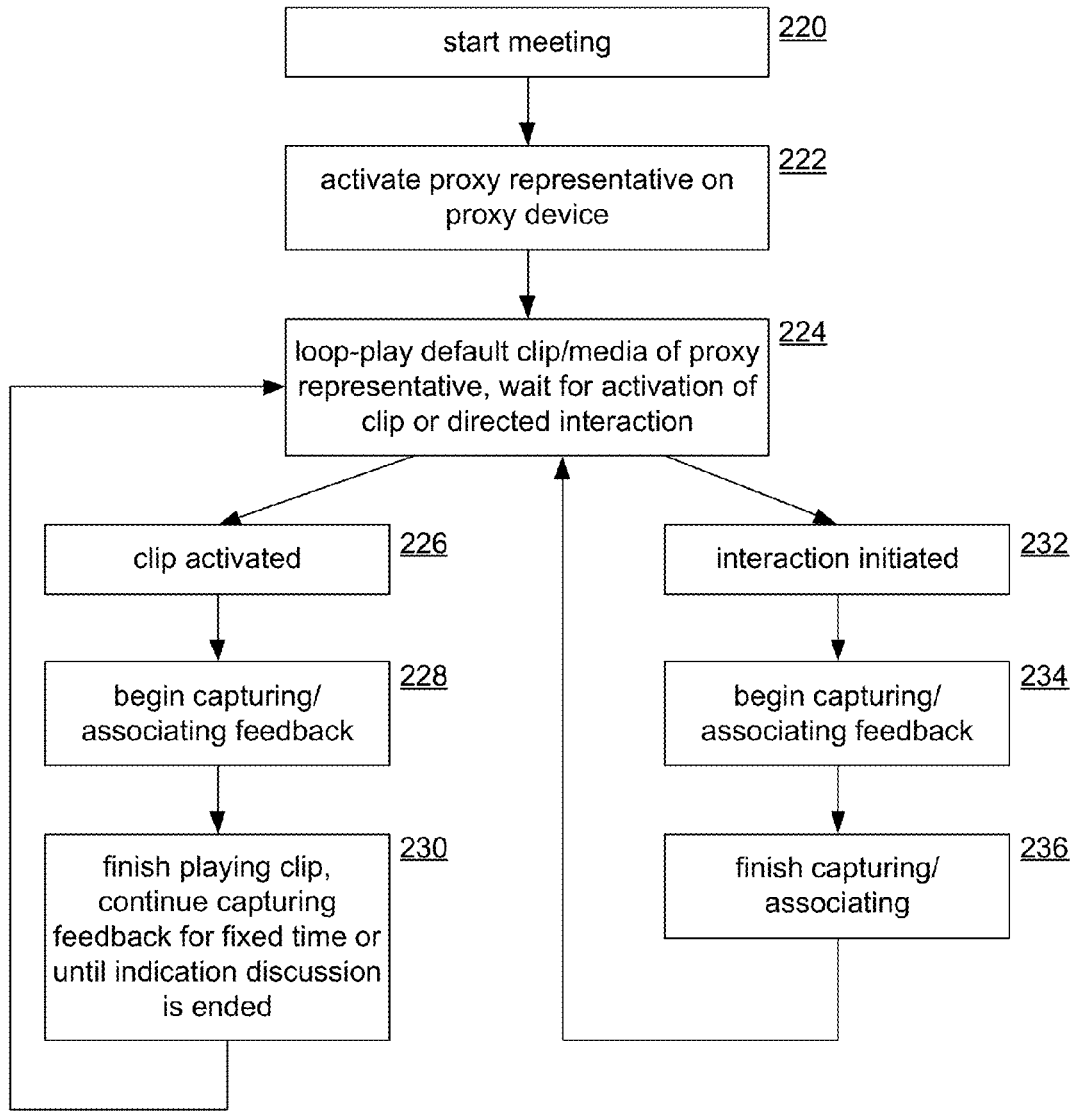
FIG. 6 shows a process performed by the proxy device.

FIG. 6 shows a process performed by the proxy device 150. At step 220 a meeting begins. At step 222 the proxy device 150 is activated. This may be done manually or may be triggered automatically such as by a signal from a meeting system that a meeting is about to begin. At step 224, when the proxy device 150 is idle, a default proxy representative clip (an avatar clip of the actual proxy participant) is repeatedly looped. For realism, a variety of non-speaking clips may be played randomly.

At some point during the meeting a pre-recorded clip is activated at step 226. Again, this may involve a physically present participant directing input to the device playing the proxy representative. The input may be a voice command, a touch on a touchscreen, a hand gesture recognized by a camera and gesture recognition system, an input on a participant's handheld device, mobile phone, or remote control that is forwarded to the represented participant, and so forth. Topics may be highlighted or suggested during the meeting if the proxy representative/device is configured with voice recognition and uses spoken keywords to identify topics relevant to the current discussion in the meeting. If an agenda is available, some topics can be brought to the fore (e.g., highlighted, animated, punctuated with a sound) at times indicated in the agenda. In conjunction with the clip being activated at step 226, the proxy representative causes capturing or associating of video of the meeting (presumably including participant feedback to the activated clip) with the activated clip. In other words, video of the meeting is captured or indexed in relation to the activated clip. At step 230 the activated clip completes and the capturing or indexing continues until some threshold duration (e.g., 30 to 60 seconds) or cutoff event occurs (e.g., no speech detected for a threshold time). The capturing or indexing may overlap with the looping of the avatar clip at step 224, which resumes when the activated clip and/or a listening avatar finishes playing. In yet another embodiment, participants may explicitly direct feedback to a particular topic or pre-recorded video clip.

When the proxy representative is not busy performing any of the steps mentioned above, a participant, at step 232, may initiate impromptu feedback for the proxy representative. This feedback may be either in association with a particular one of the topics (as with the reply button 165), for example, or the feedback may be general and unassociated. At step 234, the impromptu feedback is captured/indexed, which completes at step 236. Start and end times of the captured/indexed feedback clip may vary according to implementation, as discussed above regarding capturing feedback in response to pre-recorded clips.

Figure 7:
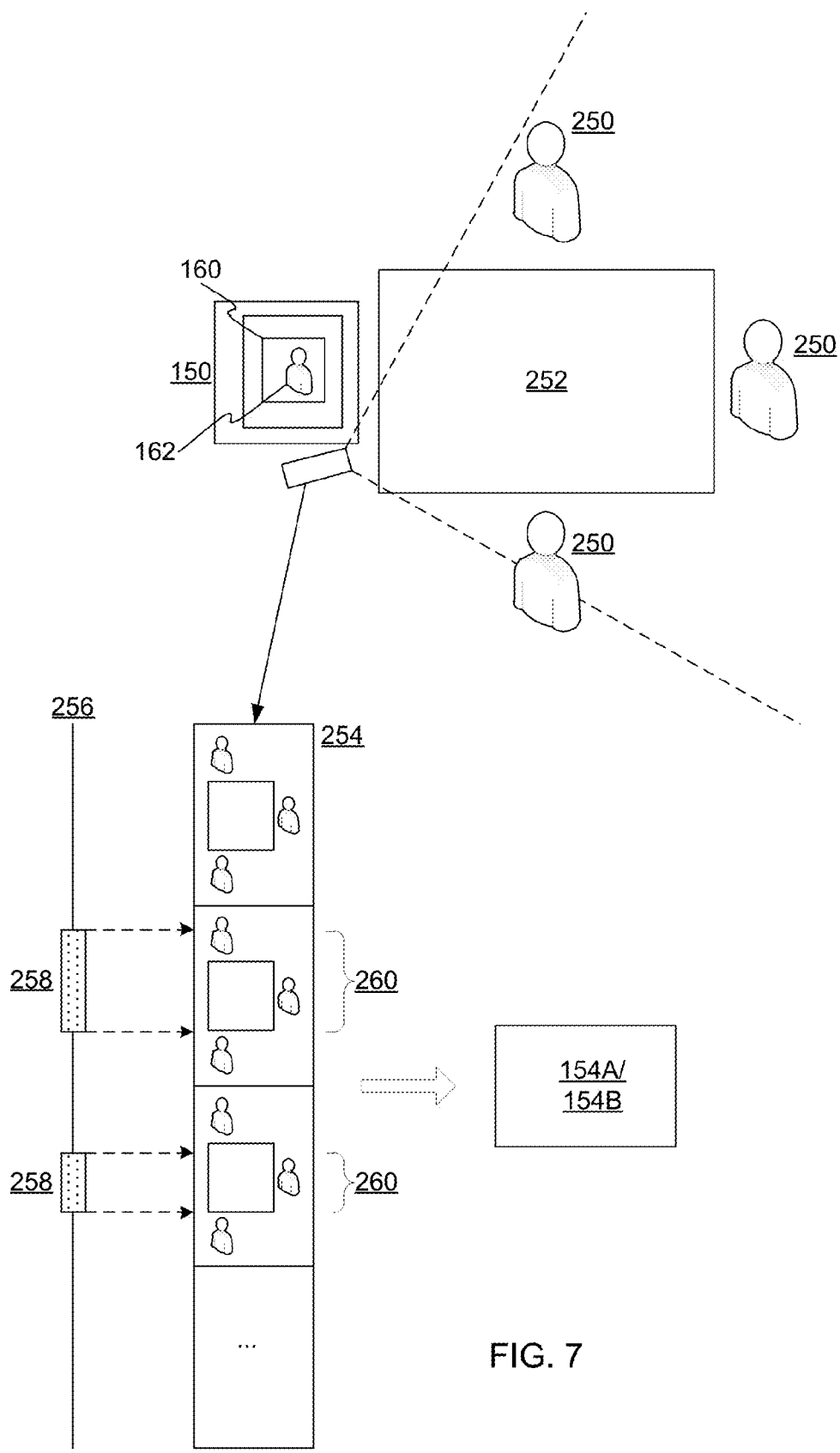
FIG. 7 shows how feedback can be captured or indexed.

FIG. 7 shows how feedback can be captured or indexed. At a meeting, participants 250 around a table 252 are at a meeting that includes a physical proxy device representing a participant, which includes at least display 160 displaying proxy representative 162. A video sequence 254 corresponds to the entire meeting. An index 256 has entries 258 that identify or correspond to portions 260 of the video sequence 254. In one embodiment, the portions 260 alone are stored in storage 154 in association with their corresponding prerecorded video clips. In another embodiment, the entire video sequence 254 is stored in the storage 154 or elsewhere, and only the index entries 258 are stored in the storage 154 in association with their corresponding pre-recorded video clips.

Figure 8:
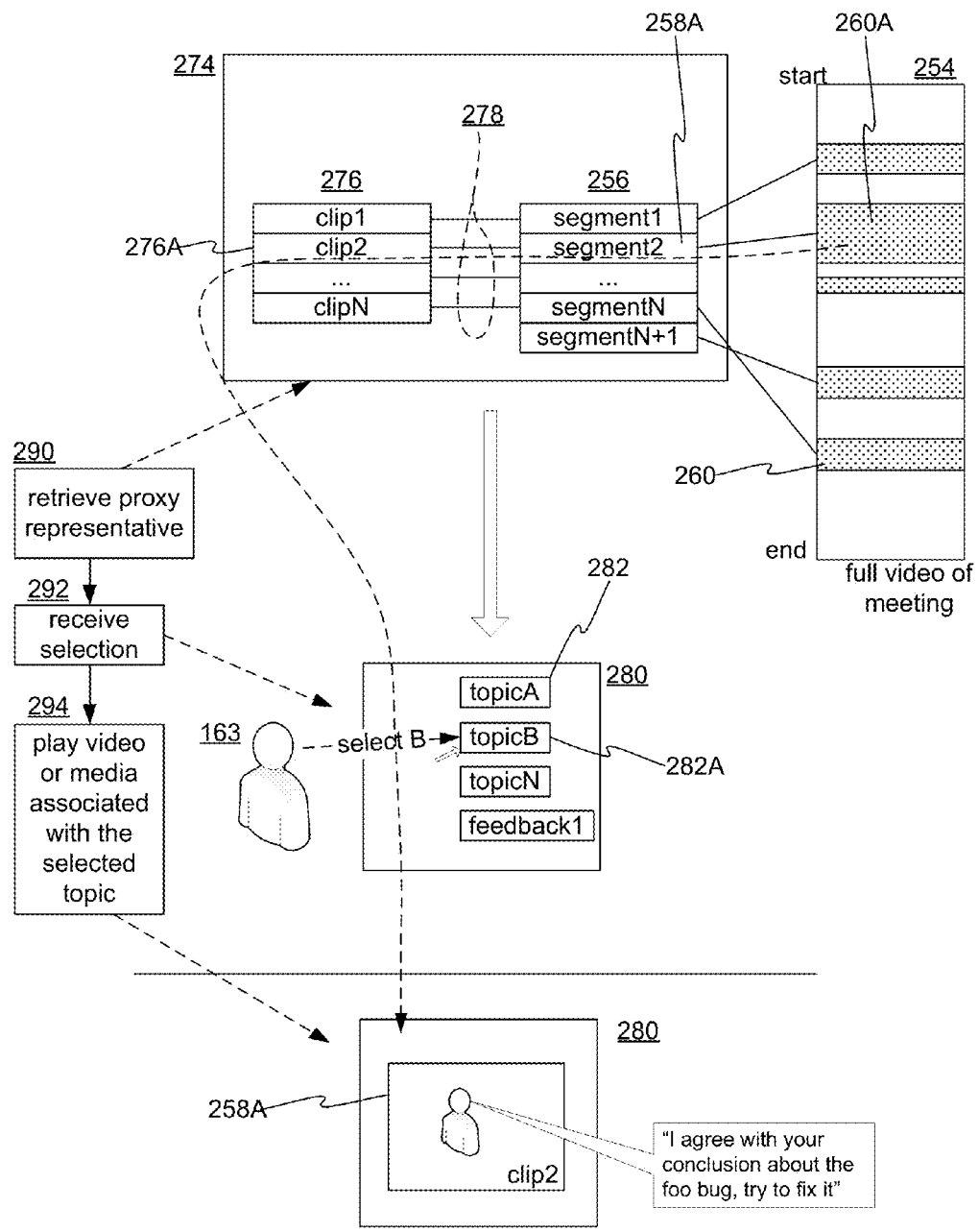
FIG. 8 shows use of feedback after a meeting.

FIG. 8 shows use of a proxy device after a meeting. After the meeting the represented participant 163 runs an application such as video conference software, e-mail software, etc., which displays a user interface and has either local or remote access to storage 274 containing video of the meeting as discussed above. The storage 274 has information that associates pre-recorded video messages played by the proxy representative/device with video segments of the meeting. In the example of FIG. 8, identifiers 276 of video clips have links 278 to the corresponding segments or portions 260 recorded from the meeting. When the represented participant 163 is ready to review the feedback obtained via the proxy device at the meeting, an application with access to storage 274 displays a feedback user interface 280. The feedback user interface 280 lists the topics 282 of the pre-recorded video messages and any impromptu feedback not associated with a pre-recorded message (e.g., "feedback1"). The list of topics may include graphics to indicate which of the pre-recorded messages were played during the meeting. An example usage will now be discussed.

At step 290 the interactions recorded during the meeting by the proxy device are retrieved by the application. That is, the application prepares any code or data needed to display any interactions or activities captured during the meeting, for instance, caching the recorded video messages. At step 292, the represented participant 163 selects a topic such as topicB 282A. The application looks up the corresponding topic or clip identifier, in this case clip2 276A. One of the links 278 points to segment2 258A and/or video portion 260A. At step 294 the proxy representative played the video associated with the selected topic; video portion 260A. In the lower half of FIG. 8, the selected segment or portion—segment2 258A—is played in the feedback user interface 280. Note that it is also possible for the represented participant 163 to select feedback not associated with a pre-recorded video clip of the proxy representative. For example, selecting "feedback1" might play segmentN+1.

It will be appreciated that feedback can be presented in numerous forms. For example, a timeline of the full meeting may be displayed, with highlights showing segments of the meeting that have feedback related to the proxy representative, perhaps color coded or labeled to indicate a corresponding topic. A highlight may be selected to play the corresponding segment and possibly show information about a related pre-recorded video message of the proxy representative.

As noted above, the proxy representative may have different appearances at different times. In addition to a basic default loop, a proxy representative may have a dynamically changing appearance according to detected conditions. For example if a microphone signal is weak perhaps indicating that participants are not speaking loudly enough, the proxy representative's avatar can change to a clip of the represented participant craning his neck or cupping her hand to her ear. If recording of feedback runs past a time limit, the avatar may change in appearance to a recording of the represented participant looking at his or her watch, etc.

After a meeting, both the attendees and the represented participant may be provided additional information to enhance communication. On one hand, the represented participant may be aided by information about how many or which messages were activated, how many people spoke after each played message, which messages had explicit feedback, etc. On the other hand, physically present participants who submitted feedback (explicitly or implicitly) might be provided with feedback about whether the represented participant reviewed the videos that were generated in the meeting. That is, meeting participants may be provided with feedback that recordings they made during the meeting were viewed. This may be in the form of email or some other visual display that communicates that the information generated at the meeting was consumed by the represented participant.

As mentioned above, proxy representative functionality can be integrated with a scheduling or teleconference system. In which case, it may be helpful to have a scheduling function to focus on an upcoming meeting within a specific timeframe. Just as the meeting itself may be scheduled, the represented participant may also have to schedule sessions for pre-recording comments and to review reactions and responses afterwards. Without such scheduling landmarks, the represented participant may not have the forcing function to give attention to a meeting in the same way that physically present participants would participate.

In another embodiment, feedback among the meeting participants is shared to encourage interaction around the topics of the meeting. The represented participant may wish other participants to be aware that comments have been pre-recorded for an upcoming meeting, and an advisory email may be sent to the participants before the meeting.

An implementation may be built using a standard three-tier architecture: a rich client, a web service, and a server back end. A rich client may provide the interface for recording and playing back videos. The video data can be stored on a web server and metadata for the videos may be stored in an SQL backend. This architecture may allow videos to be recorded and played back by the people included in a meeting using clients that interface directly with the video web service. The viewer client may be designed specifically for touch-based tablets for portability and ease of operation in a meeting.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method for asynchronous participation in a meeting, the method comprising:
   providing a proxy representative at a physical meeting of participant persons who physically attend the meeting, the proxy representative comprising a graphic displayed on a device at the meeting and representing a represented attendee who does not physically or electronically attend the meeting, the device comprising at least a display and having access during the meeting to a plurality of pre-recorded video clips of the represented attendee, the device configured to associate playback of the pre-recorded video clips at the meeting with respective video segments captured at the meeting, the device further comprising an input device and a video camera that captures video of the physical participant persons during the physical meeting;

responsive to activation events triggered by actions of the persons while physically attending the meeting, correspondingly displaying, by the device, the pre-recorded video clips on the display, wherein the activation events correspond to physical manipulations of the input device by the participant persons or correspond to physical actions of the participant persons that are sensed by the input device; and based on the activation events and/or the displaying of the pre-recorded video clips, generating and storing association information comprising associations for each respective playback of a pre-recorded video clip responsive to an activation event, wherein each association (i) associates a beginning of a corresponding pre-recorded video clip displayed per an activation event with a beginning of a corresponding video segment captured during the displaying of the corresponding pre-recorded video clip and wherein a duration of the corresponding video segment is substantially greater than a duration of the corresponding pre-recorded video clip, the video segments comprising video data of the participant persons captured during the physical meeting by the video camera, and wherein each time an event occurs a new corresponding association is generated and added to the association information.

2. A method according to claim 1, further comprising displaying on the display a plurality of user interface elements corresponding to the pre-recorded video clips, respectively, wherein the user interface elements are activated by the physical manipulations of the input device.

3. A method according to claim 2, wherein the pre-recorded video clips include a default video clip whose playing by the device during the meeting is interrupted responsive to, and at times corresponding to the activation events.

4. A method according to claim 3, further comprising initiating resumptions of playing of the default video clip responsive to endings of the pre-recorded video clips.

5. A method according to claim 2, wherein the activation events comprise activations of the user interface elements by the participant persons at the meeting.

6. A method according to claim 1, wherein an activation event comprises a voice or image recognition by the device.

7. A method according to claim 6, wherein the input device comprises the video camera or a microphone.

8. Computer storage hardware storing information to enable one or more computers to perform a process, the process comprising:

prior to a meeting, storing and providing access to a plurality of video clips of a first person, the video clips prepared by a first person prior to a meeting of participant persons, wherein meeting-associating information associating the video clips with meeting is stored prior to the meeting by the first person;

during the meeting of the participant persons each physically attending the meeting at a same physical location, where the first person does not have real time physical or electronic interactions with the participant persons during the meeting, based on the meeting-associating information, providing access to the video clips to the one or more computers during the meeting;

monitoring for, capturing, and responding to, interactions by the participant persons with the one or more computers, including responding to each detection of an interaction by selecting a video clip according to the corresponding captured interaction, wherein the interactions occur at arbitrary times decided by the participant persons, wherein the interactions control which of the video clips are to be played on a display at the meeting and when the video clips will be played, wherein the video clips are played by the one or more computers, and wherein each detected interaction is responded to by (i) selecting one of the video clips based on the corresponding interaction and playing the selected video clip, and (ii) forming a video portion having a start formed to correspond with a start of playing the selected video clip and having an end that precedes the start of any subsequent video portion, each video portion comprising video of the one or more of the participant persons at the physical location while the one or more participant persons viewed a corresponding video clip; and further during the meeting, generating and storing linking information that indicates which of the pre-recorded video clips are associated with which of the respective video portions of the meeting, the linking information comprising links, wherein each link associates a pre-recorded video clip with a corresponding video portion, the video portions captured at times corresponding to times during the meeting when the pre-recorded video clips were played.

9. One or more computer-readable storage media according to claim 8, the process further comprising, after the meeting, using the linking information to display information indicating which of the video portions are correlated with which of the pre-recorded video clips.

10. Storage hardware according to claim 9, the process further comprising, after the meeting, displaying indicia of the pre-recorded video clips to the first person, and in response to the first person selecting an indicator of one of the pre-recorded video clips, selecting a corresponding video portion of the meeting, according to the linking information, and playing the selected video portion from the start of the video portion, whereby the playing displays video of one or more of the participant persons while the pre-recorded video clip selected by the indicator was being played at the meeting.

11. Storage hardware according to claim 8, the process further comprising, after the meeting, providing feedback to one of the participant persons indicating whether the represented participant viewed a video portion of the one of the participant persons.

12. Storage hardware according to claim 8, wherein a computing device comprising the display is present at the meeting, and includes a video camera to capture the video portions.

13. Storage hardware according to claim 12, wherein displaying the interactively selected one of the pre-recorded video clips comprises participants at the meeting directing voice, gestural, or manual inputs to the computing device, and the process further comprises the computing device responding to the inputs by playing the pre-recorded video clips and capturing the video portions and associating them with the respective pre-recorded video clips.

14. One or more computer-readable storage media according to claim 8, the process further comprising displaying an image of a participant to the represented participant when the represented participant is recording one of the video clips prior to the meeting.

15. Storage hardware according to claim 8, wherein the video portions comprise segments of a full video capture of the meeting, and wherein the linking information includes information identifying the video portions of the full video capture, the linking information allowing the first person to determine which video portions correspond to which of the pre-recorded video clips.

16. A computing device comprising a display, a processor, and memory:
the memory storing instructions configured to, when the computing device is operating, cause the processor to:
display on the display, at a meeting of participant persons attending the meeting in-person, default media of a person, the person not physically or electronically attending the meeting of participant persons;
respond to detections of interactions of the participants with the computing device by interrupting the default media to play respective pre-recorded video clips of the person not attending the meeting, wherein the pre-recorded video clips are selected according to the interactions of the participants such that the participants determine by their interactions which of the pre-recorded video clips are played and when they are played, wherein a video camera at the meeting captures video segments of participant responses to the pre-recorded video clips during respective playings of the pre-recorded video clips, each video segment having a beginning formed to correspond to the start of an interaction-triggered playing of a corresponding pre-recorded video clip; and
store association information indicating which of the video segments are associated with which of the respective pre-recorded video clips.

17. A computing device according to claim 16, the instructions further configured to cause the processor, when operating, to display interactive user interface elements identifying topics of the pre-recorded video clips, respectively, and a participant interaction comprises an activation of a user interface element, the activation in turn triggering (i) playing of a corresponding pre-recorded video clip and capture of a corresponding video segment of participant reaction to the pre-recorded video clip and (ii) including in the association information a link between the video segment and the pre-recorded video clip or the topic corresponding thereto.

18. A computing device according to claim 16, the instructions further configured to cause the processor to enable the person who did not attend the meeting to select any of the pre-recorded video clips, wherein when one of the pre-recorded video clips is selected, the software identifies and plays a corresponding video segment that captured participant reaction to the selected pre-recorded video clip.

19. A computing device according to claim 16, wherein the video segments each consist of video data corresponding to portions of time of the meeting that are less than the entire meeting.

20. A computing device according to claim 16, wherein one or more of the video segments are captured in response to a participant person interacting with the computing device.

* * * * *